Sept. 29, 1964  P. PROFOS  3,150,642
HEAT TRANSFER SYSTEM
Filed July 15, 1960  2 Sheets-Sheet 1

3,150,642
HEAT TRANSFER SYSTEM
Paul Profos, Winterthur, Switzerland, assignor to Sulzer Freres, S.A., Winterthur, Switzerland, a corporation of Switzerland
Filed July 15, 1960, Ser. No. 43,125
Claims priority, application Switzerland July 20, 1959
3 Claims. (Cl. 122—33)

The present invention relates to a heat transfer system wherein heat is exchanged between two fluids flowing at least in part in countercurrent fashion, one of said fluids entering the system at a relatively high and constant initial temperature and the velocity of flow of this first fluid being altered according to the heat demanded by the second fluid to which heat is transferred from the first fluid so that the temperature of the first fluid leaving the system is also substantially constant. The second fluid enters the system in liquid state and is evaporated and superheated by heat transferred from the first fluid. The superheated vapor usually serves for operating a turbine of a power plant.

Heat transfer systems as described above are used, for example, in power plants deriving their heat from a nuclear reactor. The heating fluid is usually in the gas state and acts as coolant for the reactor. The temperatures of this gaseous fluid at the inlet and at the outlet of the heat transfer system are maintained constant by conventional control apparatus. These temperatures are so low that there is no appreciable heat radiation and almost all heat is transferred in the transfer system by convection. For changing the amount of heat transferred in the system to comply with changing load to be produced by the power plant, the velocity of the reactor coolant circulating through the reactor and through the heat transfer system is changed. If the load is reduced and less vapor or steam is demanded, the velocity of the flow of the second fluid, i.e. the operating medium of the power plant through the heat transfer system, is reduced, and vice versa. Depending on the amount of heat transferred, the point where the operating medium is completely vaporized moves within the heat transfer system. If the two fluids move countercurrent, this point moves downstream with respect to the direction of flow of the second fluid when the load is reduced.

Wandering in the heat transfer system of the point where the second fluid is completely evaporated and in dry vapor state is undesirable, particularly if a liquid separator is interposed in the conduit means conducting the second fluid, and it is an object of the present invention to provide a system for transferring heat from a first fluid to a second fluid which enters the system in liquid state and leaves the system in superheated vapor state whereby the point at which the second fluid reaches the dry vapor state moves as little as possible in the system when the output of the system is changed.

Movement of the point where evaporation of the second fluid is completed, when the output of the system is reduced, can be counteracted by introducing less second fluid in liquid state into the system than vapor is demanded from the system and feeding the missing balance of the second fluid into the superheating portion of the system. When operating in this manner, a relatively small amount of second fluid passes at reduced velocity through the evaporating portion of the system so that the flow of the second fluid in the evaporating portion becomes unstable and parts of the tubes which conduct the second fluid are insufficiently cooled so that they may be damaged. Injection of relatively great amounts of liquid second fluid into the superheating sections of the system requires large and expensive injection apparatus and controls therefor, and, if the injected liquid is not absolutely pure, may cause deposits of matter which cannot be evaporated in the relatively hot superheating tubes where such deposits are least desired.

These disadvantages are avoided according to the present invention by dividing the conduit means conducting the second fluid through the heat transfer system into a plurality of sections through which the second fluid flows in series relation, by placing the section through which flows the relatively coolest second fluid into the coolest part of the stream of the first or heating fluid, by placing the section through which flows the relatively hottest second fluid into the hottest zone of the stream of the first fluid, and by placing at least one of the intermediate sections through which flows the second medium at intermediate temperatures into a warmer part of the stream of the first fluid than the sections would be placed if the counterflow principle were strictly followed.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Figure 1:
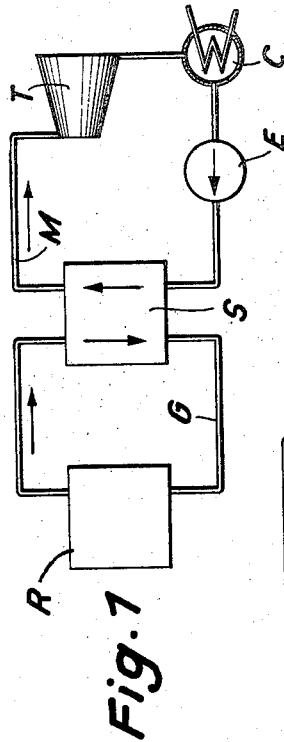
FIG. 1 is a diagram showing the coolant circuit and the circuit of the operating medium in a nuclear power plant.

Referring more particularly to FIG. 1, the heat generated in a nuclear reactor R is transferred in a heat exchanger S from a coolant for the nuclear reactor to an operating medium which drives a turbine T. The coolant, which is usually a gas, flows in a circuit G in the direction of the arrows. This first fluid absorbs heat in the nuclear reactor R and carries the heat into the heat exchanger S surrendering a portion of the heat to an operating medium flowing in the circuit M, whereupon the first fluid is returned to the nuclear reactor R to be heated once more. The operating medium, which is the second fluid in the system, is a substance, for example water, which is vaporized and superheated in the heat transfer system. The operating medium leaves the heat exchanger S and enters the turbine T as superheated steam which is expanded in the turbine so that in most cases wet steam is exhausted from the turbine and condensed in a condenser C. The condensate is returned by means of a pump E to the heat exchanger S.

Figure 2:
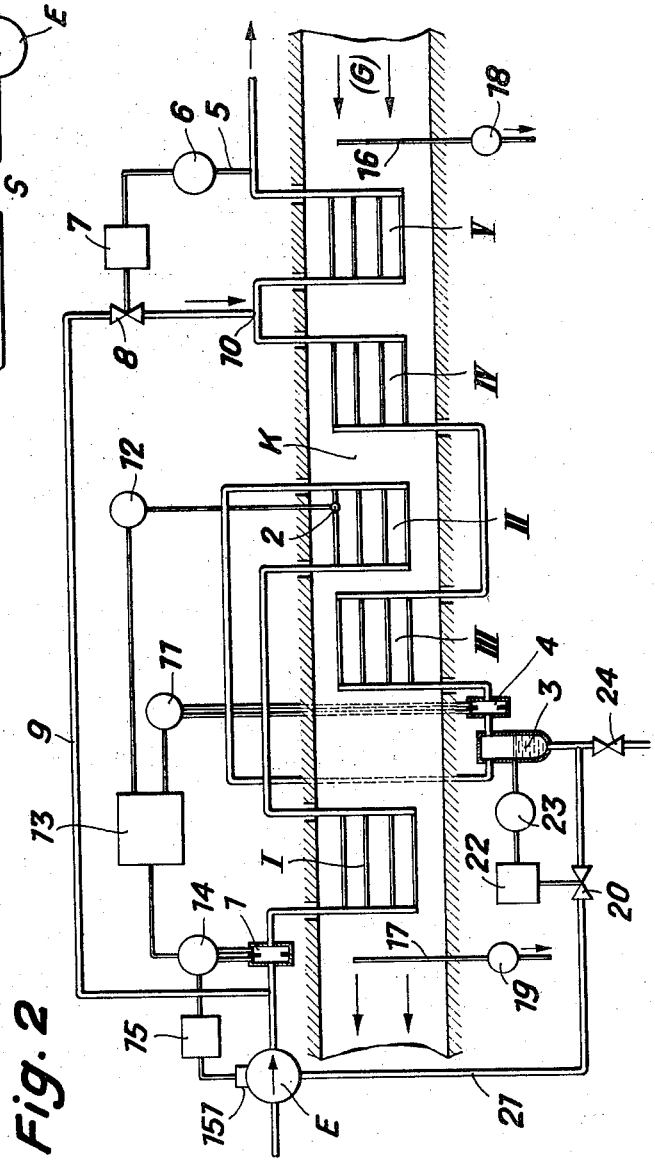
FIG. 2 is a diagrammatic illustration of a heat transfer system forming part of the plant shown in FIG. 1.

FIG. 2 is a detailed illustration of the heat transfer system forming part of the plant shown in FIG. 1. A second fluid, which is the operating medium of the turbine T, is pumped in liquid state by means of a feed pump E through an orifice 1 into a first heat transfer section I wherefrom the second fluid flows into a heat transfer section II serving as an evaporator. A temperature sensing device 2 is provided close to the outlet of the section II. The operating medium leaving the section II passes through a liquid separator 3 wherein liquid present in the operating medium is separated. The remaining vapor or steam flows through an orifice 4 into a heat transfer section III serving as a preliminary superheater and therefrom consecutively through heat transfer sections IV and V, section IV being a preliminary superheater and section V a final superheater. The operating medium leaving the last section V is in the state of superheated vapor or steam and flows to the turbine T. The temperature of the superheated vapor or steam leaving the section V is measured by a temperature sensing device 5 connected to a signal producing means 6. The signals produced in the latter are transmitted to a regulator 7 which operates a valve 8 controlling the flow of liquid operating medium from the feed pump E through a pipe 9 to a point 10 which is interposed between the heat exchanger sections IV and V. The orifice 4 is used for measuring the rate of flow of operating medium from the separator 3 to the preliminary superheater III and actuates a signal producing device 11. The signals produced in the latter are transmitted to a controller 13. The latter receives also signals produced in a device 12 and corresponding to the temperature sensed at 2. The signals produced in the controller 13 are combined with signals produced in a device 14 and corresponding to the rate of flow of operating medium through the orifice 1. The combined signals produced in the device 14 actuate a motor operator 15 actuating a controller 151 for controlling the speed of the feed pump E and the amount of liquid operating medium fed into the heat transfer system. A first or heating fluid flows through a duct K forming part of the circuit G and receiving hot reactor coolant from the reactor R. The heat transfer sections I to V are placed in the duct K in the sequence I, III, II, IV, V. At the inlet of the duct K, where the hot reactor coolant enters the duct, a temperature measuring device 16 is provided and a temperature measuring device 17 is placed in the outlet of the duct K where the relatively cool reactor coolant leaves the heat transfer system. The temperature measuring devices 16 and 17 actuate conventional signal producing devices 18 and 19, respectively, which control, in the conventional manner, the velocity of the coolant passing through the duct K.

The liquid space of the separator 3 is connected by means of a pipe 21 provided with a valve 20 to the feed pump E. The valve 20 is controlled by a motor operator 22 which is actuated by a conventional controller 23 which is responsive to the liquid level in the separator 3. A blowdown pipe provided with a valve 24 is connected to the pipe 21 for conducting blowdown liquid, for example, to a conventional device for measuring the amount of substances which cannot be vaporized, in the blowdown liquid or for measuring the radioactivity of the blowdown liquid and for removing the blowdown liquid from the circuit of the operating medium, or for returning the blowdown liquid to the circuit after purification in a conventional apparatus, not shown.

Figure 3:
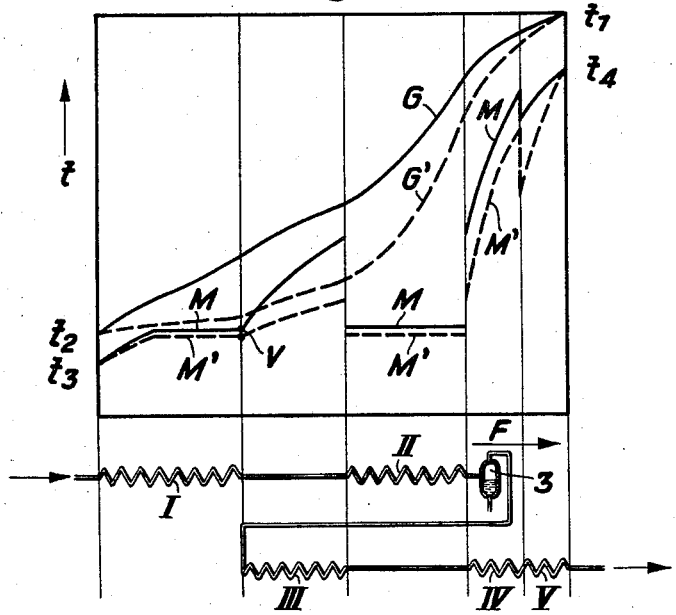
FIG. 3 is a diagram showing the temperatures of the coolant and of the operating fluid as they flow along the heat transfer surface of the heat transfer system shown in FIG. 2.

The diagram FIG. 3 shows the temperatures in a heat exchanger system as shown in FIG. 2 along the heat exchange surface F of the system. The lines G, G' represent the temperature of the reactor coolant and the lines M, M' represent the temperatures of the operating medium. The solid lines G, M indicate the temperatures when the system is operated at full load. The dotted lines G' and M' indicate the temperatures when the system is operated at partial load. The reactor coolant, which is also termed the first fluid in this specification, enters the heat transfer system at a substantially constant inlet temperature $t_1$. It is cooled to a substantially constant outlet temperature $t_2$. The operating medium, which is also termed the second fluid in this specification, enters the heat exchange section I in liquid state at the temperature $t_3$ and is heated up to the evaporating temperature and partly vaporized in the section I. The vaporization of the second fluid is continued and completed in the heat exchanger section II. The operating medium or second fluid which is now in dry vapor state is superheated in the heat exchanger sections III, IV and V. The temperature of the superheated vapor or steam leaving the section V is maintained at the desired outlet temperature $t_4$ by injecting a suitable amount of liquid operating medium into the operating medium passing from the heat exchange section IV to the heat exchange section V.

When the system is operated at partial load, the temperatures are as indicated by the dotted lines G' and M'.

A comparison of the lines M and M' shows that the temperature increase of the superheated steam in the section III is much smaller when operating at partial output than when operating at full output. If the section III would be arranged in the duct K in the conventional manner at the location where, according to the invention, the section II is placed and the section II would be placed where, according to the invention, the section III is located, the point $v$ where the operating medium is in dry vapor state would move to the right in the diagram FIG. 3, because not enough heat would be available in the left part of the diagram. The subsequent temperature increase would be much steeper than with the arrangement according to the invention and more liquid operating medium would have to be injected at point 10 to maintain the desired superheat temperature of the operating medium leaving the system.

The arrangement of the heat exchange sections in the duct K according to the invention counteracts a displacement of the point where the operating medium is fully vaporized when the output of the system is changed. With the arrangement according to the invention, the displacement of the point where the operating medium is fully vaporized can be held within desired limits or can be prevented altogether.

Figure 4:
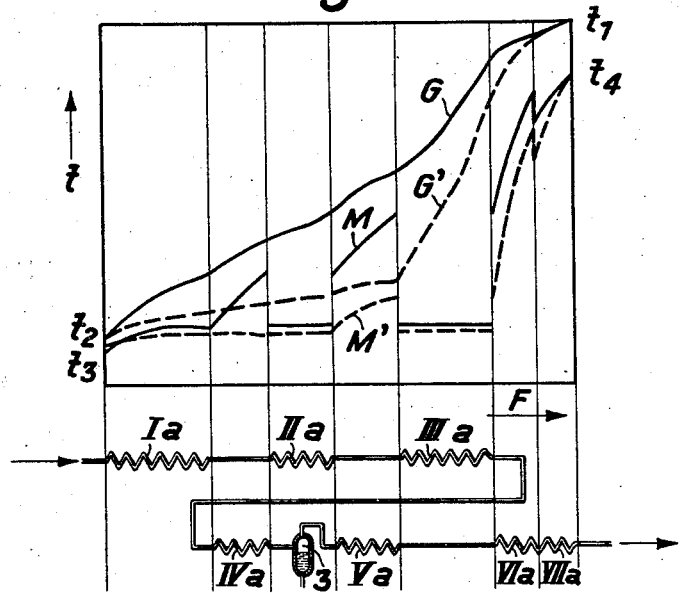
FIG. 4 is a diagram showing the temperatures of the coolant and of the operating fluid as they flow along the heat transfer surface of a modified heat transfer system which is diagrammatically illustrated in FIG. 4.

The arrangement according to the invention is particularly effective if, as shown in FIGS. 3 and 4, a section in which a substantial part of the operating medium is in liquid state and has a constant, relatively low temperature is placed in an advanced position in the duct K, i.e. in a zone of the stream of the first fluid which is hotter than the zone of the stream in which a subsequent heat exchange section is located.

FIG. 4 illustrates a modified arrangement of the heat exchange sections and also the temperatures prevailing in this modified arrangement. The entire heat transfer surface is subdivided into sections Ia to VIIa which are passed by the first or heating fluid, which is the reactor coolant G in the sequence VIIa, VIa, IIIa, Va, IIa, IVa, Ia. With this arrangement, the amount of liquid second fluid which must be injected into the operating medium to maintain the outlet temperature of the latter at the desired value is considerably reduced; there is, however, a slight displacement of the point where the second fluid is fully vaporized, when the output of the system is changed. In the arrangement shown in FIG. 4, the separator 3 is placed at a point where the operating medium or second fluid is slightly superheated when the system is operated at full load. With this arrangement the separator 3 receives wet vapor or steam when the system is operated below a predetermined partial output, for example below half output. If the separator is arranged in this manner, excess liquid operating medium may be introduced into the heat exchange conduit when the system is operated at partial output, for stabilizing the flow of the operating medium in the heat exchange parts which are upstream of the separator. This excess liquid fluid is separated in the separator and is returned to the feed pump.

The illustrated examples comprise liquid separators. However, the system according to the invention is not limited to the use of liquid separators; it may be operated without a separator.

The invention is not limited to the particular relative placements of the heat exchange sections shown. These relative placements may be varied in many ways without departing from the scope of the present invention. The system may be arranged so that the point where the second fluid is fully vaporized does not move when the output of the system is altered, or the relative placement of the individual heat exchange sections may be so arranged that a constant temperature of the superheated vapor or steam produced in the system is obtained without changing the amount of liquid fluid injected into the superheated vapor or steam when the output is altered.

Instead of placing a heat exchange section into an advanced position in the duct K, i.e. into a zone where the temperature of the first fluid is higher than in the zone where the heat exchange section would be located in a conventional system, another heat exchange section may be placed backward into a zone which is cooler than the zone in which this section would be located in a conventional system. A similar effect may be obtained by placing one heat exchange section in parallel relation to another heat exchange section in the same temperature zone of the duct K instead of arranging one of these sections ahead or downstream of the other section.

It may be of advantage to conduct the operating medium through one or more of the heat exchange sections so that it flows in the same direction as or crosscurrent to the heating fluid instead of countercurrent thereto.

I claim:

1. A heat exchanger wherein heat is transferred from a relatively hot gas supplied exclusively from outside of said heat exchanger to a relatively cool fluid which enters the heat exchanger in liquid state and leaves the heat exchanger in superheated steam state, comprising:

duct means having an inlet portion receiving the hot gas and having an outlet portion for discharging the gas, and
   tubular conduit means placed in said duct means and having a plurality of sections connected in series relation for conducting the relatively cool fluid through said duct means,
   a first of said sections being placed in said outlet portion of said duct means and passed first by said fluid in liquid state,
   means for pumping said fluid in liquid state at variable flow rates into said first section,
   one of said sections forming a final superheater and being placed in said inlet portion of said duct means and passed last by said fluid in superheated steam state.
   one of said sections forming an evaporaor wherein the fluid is evaporated,
   one of said sections forming a preliminary superheater preliminarily superheating the steam before the steam enters said final superheater,
   said section forming an evaporator being placed in said duct means upstream with respect to the flow of the heating gas in said duct means, of said section forming a preliminary superheater.

2. A heat exchanger as defined in claim 1 wherein said section forming an evaporator is connected to said first section for receiving the fluid therefrom, said section forming a preliminary superheater is connected to said section forming an evaporator for receiving evaporated fluid therefrom, and said section forming the final superheater is connected to said section forming a preliminary superheater for receiving superheated steam therefrom.

3. A heat exchanger according to claim 2 wherein a water separator is interposed in said conduit means downstream, with respect to the flow of said fluid, of said section forming an evaporator and upstream, with respect to the flow of said fluid, of said section forming a preliminary superheater.

References Cited in the file of this patent
UNITED STATES PATENTS

| | | |
|---|---|---|
| 2,365,305 | Stromquist | Dec. 19, 1944 |
| 2,555,043 | Lewis | May 29, 1951 |

FOREIGN PATENTS

| | | |
|---|---|---|
| 807,658 | Great Britain | Jan. 21, 1959 |
| 1,137,586 | France | Jan. 14, 1957 |
| 1,200,417 | France | June 29, 1959 |